H. SIESHOLTZ.
STRAP CONNECTION FOR JACQUARD DEVICES.
APPLICATION FILED OCT. 4, 1920.
1,378,567.
Patented May 17, 1921.
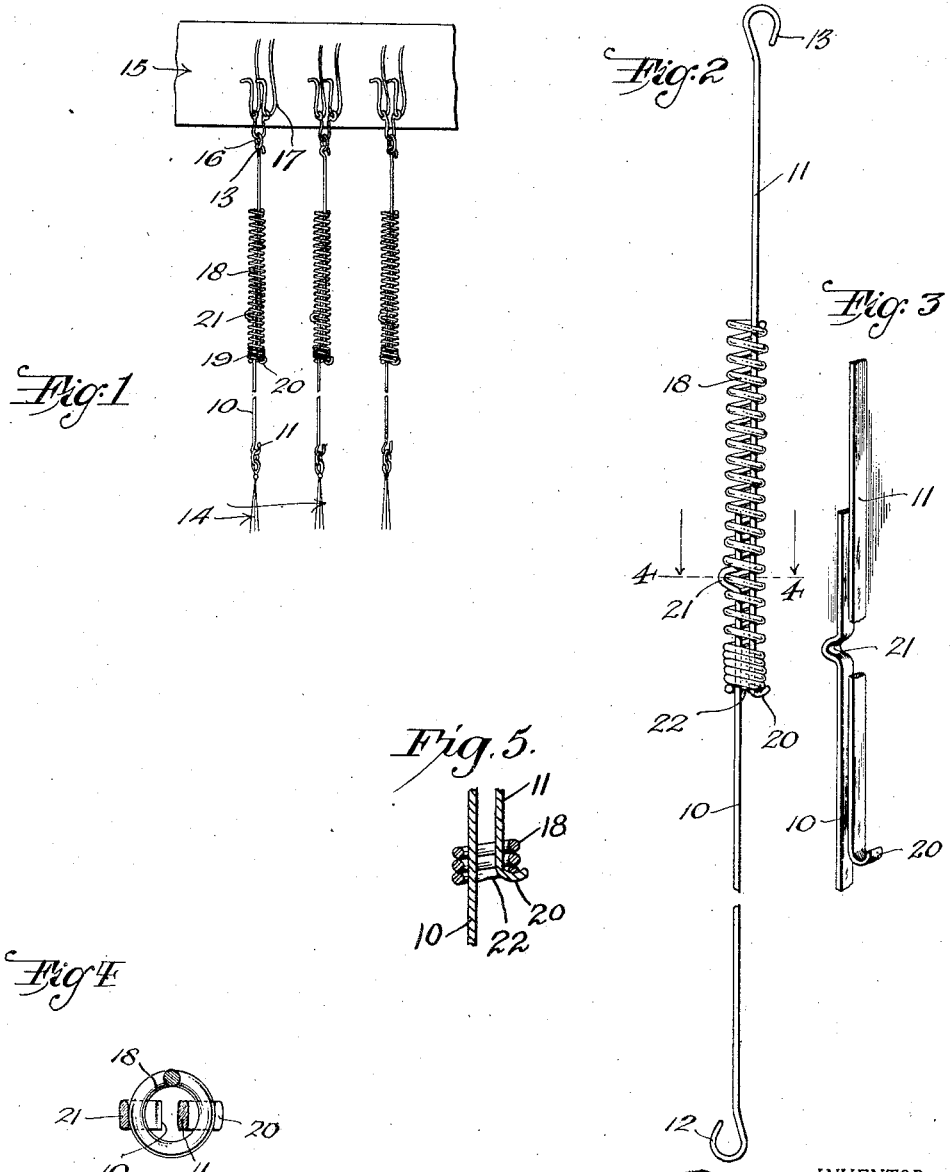

UNITED STATES PATENT OFFICE.

HERBERT SIESHOLTZ, OF ALLENTOWN, PENNSYLVANIA.

STRAP CONNECTION FOR JACQUARD DEVICES.

1,378,567. Specification of Letters Patent. Patented May 17, 1921.

Application filed October 4, 1920. Serial No. 414,528.

*To all whom it may concern:*

Be it known that I, HERBERT SIESHOLTZ, a citizen of the United States of America, residing at Allentown, in the county of Lehigh and State of Pennsylvania, have invented certain new and useful Improvements in Strap Connections for Jacquard Devices, of which the following is a specification.

My present invention relates generally to looms and more particularly to Jacquard looms for weaving ribbon and like silk goods, my object being the provision of an improved harness connecting link with readily adjustable harness setting means, which will be easy to operate, and simple, strong and durable in use.

In the accompanying drawing,

Figure 1 is an elevation illustrating in more or less diagrammatic manner, the practical application of my invention, Fig. 2 is an enlarged detail side view of my improved connection or link, Fig. 3 is a perspective view of the overlapping portions of the link members, Fig. 4 is an enlarged cross section taken on line 4—4 of Fig. 2, Fig. 5 is an enlarged vertical section through the lower portion of the connecting spring.

Referring now to these figures, I have shown in Fig. 2 a harness link or setting connection including a pair of relatively adjustable arms 10 and 11, whose relative adjustment results in varying the effective length of the link or connection as a whole. Of these arms, whose outer ends terminate in hooks 12 and 13, arm 10 is for connection with the harness, portions of which are shown at 14 in Fig. 1, while the arm 11 is for connection with the jacquard mechanism as at 15 in Fig. 1.

The connection of the hooks 12 and 13 is preferably accomplished by rings 16 certain of which rings are directly connected to the harness 14 for engagement by hooks 13 and the other of which rings are connected to the usual jacquard hooks 17 for engagement by hooks 12.

The inner overlapping portions of the arms 10 and 11 are surrounded by an elongated coil spring 18 whose lower end is tightly coiled as at 19 forming substantially a head which is engaged by the lower angular extremity 20 of the arm 11 as clearly seen in Fig. 2.

For the purpose of holding the spring 18 in adjustable relation thereto, arm 10 has adjacent to its upper end an angular bend 21 within which a portion of the spring is seated and thus adjustably anchored, making it merely necessary to rotate the spring in order to shift the same lengthwise with respect to arm 10 and in this way adjust the arms 10 and 11 with respect to one another.

To normally prevent rotation of the spring, the spring head 19 has lower grooves or recesses 22 in which the lower angular extremity of the arm 11 seats, thus forming a guard against accidental shifting movement of the spring and a lock for adjustment thereof when adjustment is once made.

I claim:—

1. A harness connecting link for Jacquard looms comprising a pair of lengthwise shiftable parallel arms having hooks at their outer ends and having overlapping inner ends, a spring embracing the said overlapping ends and loosely engaged by the inner end of one of the arms, the other of said arms having an inwardly opening bend in which a portion of the spring is seated whereby the spring may be rotated to shift the same with respect to the said arm.

2. A harness connecting link for Jacquard looms consisting of parallel attaching arms having inner overlapping ends, an elongated coil spring through which the said inner ends are extended, spring engaging and holding means on one of the arms, with which the spring has rotatable engagement to adjust the spring lengthwise of the arm, the other of said arms having means at its inner end engaging the spring and normally preventing rotation thereof.

3. A device of the character described consisting of parallel attaching arms having overlapping inner ends and each provided with engaging means at its outer end, and a coil spring embracing the said overlapping ends and engaged at one end by the inner end of one of said arms, the other arm having an integral portion intermediate its ends in which the spring is adjustably engaged and through which the spring is rotatable to effect its lengthwise shifting movement on said arm.

4. A device of the character described, consisting of parallel attaching arms having inner overlapping ends, a coil spring embracing and supporting said ends in parallel relation, having one recessed end, one of said arms having means engaging the spring and with respect to which the spring is rotatable to effect its longitudinal adjustment, and the other of which arms has an angular extremity seated in an end recess of the spring to normally prevent rotation of the spring.

In testimony whereof I have affixed my signature.

HERBERT SIESHOLTZ.